United States Patent
Devarakonda et al.

(10) Patent No.: US 8,005,781 B2
(45) Date of Patent: Aug. 23, 2011

(54) CONNECTION OF VALUE NETWORKS WITH INFORMATION TECHNOLOGY INFRASTRUCTURE AND DATA VIA APPLICATIONS AND SUPPORT PERSONNEL

(75) Inventors: Murthy V. Devarakonda, Peekskill, NY (US); Nikolai Joukov, Thornwood, NY (US); Manoj Kumar, Yorktown Heights, NY (US); Konstantinos Magoutis, Heraklion (GR); Wlodek Wlodzimierz Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/135,534

(22) Filed: Jun. 9, 2008

(65) Prior Publication Data

US 2009/0307174 A1    Dec. 10, 2009

(51) Int. Cl.
*G06F 17/00* (2006.01)
*G06N 5/02* (2006.01)

(52) U.S. Cl. .......................................................... 706/48
(58) Field of Classification Search ...................... 706/48
See application file for complete search history.

(56) References Cited

U.S. PATENT DOCUMENTS

| | | | | |
|---|---|---|---|---|
| 5,450,315 | A * | 9/1995 | Stefanski | 700/48 |
| 5,535,303 | A * | 7/1996 | Ekchian et al. | 706/26 |
| 5,857,177 | A * | 1/1999 | Alstr.o slashed.m et al. | 706/15 |
| 6,108,648 | A * | 8/2000 | Lakshmi et al. | 1/1 |
| 6,785,736 | B1 * | 8/2004 | Barillaud | 709/241 |
| 7,046,082 | B2 * | 5/2006 | Komiya et al. | 330/51 |
| 7,168,014 | B2 * | 1/2007 | Ghosh et al. | 714/712 |
| 7,725,329 | B2 * | 5/2010 | Kil et al. | 705/2 |
| 7,738,495 | B2 * | 6/2010 | Dalal et al. | 370/476 |
| 7,747,723 | B2 * | 6/2010 | Ogawa et al. | 709/223 |

OTHER PUBLICATIONS

An Energy-Efficient Clustering Technique for Wireless Sensor Networks, Guan Xin; Wang YongXin; Liu Fang; Networking, Architecture, and Storage. NAS '08. International Conference on Digital Object Identifier: 10.1109/NAS.2008.51 Publication Year: 2008 , pp. 248-252.*

Discourse theories vs. Topic-Focus articulation applied to prosodic focus assignment in Romanian, Curteanu, N.; Trandabat, D.; Moruz, M.A.; Speech Technology and Human-Computer Dialogue. SpeD '09. Proceedings of the 5-th Conference on Digital Object Identifier: 10.1109/SPED.2009.5156182 Publication Year: 2009 , pp. 1-10.*

Cross-Media Alignment of Names and Faces, Phi The Pham; Moens, M.-F.; Tuytelaars, T.; Multimedia, IEEE Transactions on vol. 12 , Issue: 1 Digital Object Identifier: 10.1109/TMM.2009.2036232 Publication Year: 2010 , pp. 13-27.*

Infinite electrical networks with finite sources at infinity, Zemanian, A.; Circuits and Systems, IEEE Transactions on vol. 34 , Issue: 12 Digital Object Identifier: 10.1109/TCS.1987.1086090 Publication Year: 1987 , pp. 1518-1534.*

(Continued)

*Primary Examiner* — Michael Holmes
(74) *Attorney, Agent, or Firm* — Scully, Scott, Murphy & Presser, P.C.; Stephen C. Kaufman, Esq.

(57) ABSTRACT

A method and a system for relating of a value network analysis of a mission to a knowledge base of dependencies of data objects, applications and information technology resources required for achieving of such mission, such method used for optimization of provisioning for information technology resources and for prioritizing of control of data and application security and integrity of such mission.

20 Claims, 4 Drawing Sheets

OTHER PUBLICATIONS

Wlodek Zadrozny, "Leveraging the Power of Intangible Assets", MIT Sloan Management Review, Fall 2006, pp. 85-91, vol. 48 No. 1, Massachusetts Institute of Technology, 2006, USA.

Kostas Magoutis, et al., "Galapagos: Automatically Discovering Application-Data Relationships in Networked Systems", IBM T.J. Watson Research Center, Hawthorne, New York 10532.

* cited by examiner

CONNECTION OF VALUE NETWORKS WITH INFORMATION TECHNOLOGY INFRASTRUCTURE AND DATA VIA APPLICATIONS AND SUPPORT PERSONNEL

FIELD OF THE INVENTION

The invention relates generally to the field of information technology (IT). More specifically, the invention describes a method of relating information about missions of each and every phase of a business or military operation, expressed as a Value network, to a corresponding existing application—data relationship within an information technology infrastructure, for optimizing the process of provisioning for data and data security and integrity.

BACKGROUND OF THE INVENTION

Mission is hereby defined as an undertaking of a resource and personnel commitment for achieving a specifically defined goal within specifically defined time period for the benefit of a business organization or a military operation.

Modern information technology infrastructures of business or military operations present a worldwide web of servers, workstations, printers, faxes, data storage devices, routers, switches and other computer and network systems. The main objective of such systems is to improve productivity by streamlining communication process and by delivering strategic applications and data to users within such business or military entity.

Over time, more and more utilizations are being assigned to such infrastructures. Each new utilization requires new methods of assuring communications' and applications' data security and integrity. All such methods, in turn, demand provisioning for more hardware, software and manpower resources for their upkeep and maintenance.

As a result, in most of today's global information technology infrastructures, there exists a significant disconnect between the high-level information about the critical missions at all phases of business and military operations and knowledge of IT infrastructure and application—data relationships that these missions depend on.

Consequently, the IT resources are either over provisioned, under provisioned, or both. This results in overspending and can lead to mission failures. Moreover, such over provisioning is not always possible.

Therefore, there exists a need to provide a method for connecting the knowledge about missions with information about corresponding IT resources. More specifically, there exist a need for integrating existing high level mission application data with metadata produced by systems and applications within IT infrastructure.

Modern applications follow a layered architecture using application and data middleware tiers. Such layering typically reflects different levels of application abstraction such as user interface, business logic, application services, data services and group communication services, as well as infrastructure (node) virtualization.

Several approaches are possible to collect information about the cross-layer data relations. For instance, there is a known data relations modeling method that allows discovering end-to-end application and data relations. This method is implemented by using provenance—aware storage systems, that are capable of collecting complete history of information that describes data in sufficient detail to facilitate reproduction and to enable validation of results, and by using systems that attempt to dynamically track the data transfers and modifications.

One example of such data relations modeling system is Galapagos system, which is designed to discover usage of data in a large distributed system. In essence, this system enriches basic infrastructure discovery with knowledge of how data is used by applications (e.g., business objects, tables, files, etc.) in addition to information about data providers (e.g., enterprise information system, database systems, etc.)

Galapagos discovers and represents all end-to-end, multi-tier dependencies between applications and data in an n-tiered distribution system. Moreover, it does so in an easily extensible fashion: adding a new (n+ith) middleware tier in an n-tiered system automatically includes the new tier in its representation of end-to-end relationships. This system is described in great detail in Integrated Network Management, 2007. IM '07 $10^{th}$ IFIP/IEEE International Symposium. K. Magoutis, M. Devarakonda, K. Muniswamy-Reddy and IBM T.J. Watson Research Center, "*Galapagos: Automatically Discovering Application—Data Relationships in Networked Systems*" the whole contents of which is incorporated by reference as if fully set forth herein.

Representation of mission level data values and their exchanges is best described by a Value Network Analysis (VNA) that usually relies on Community Knowledge Systems (CKS) and information mining technologies. VNA is a business modeling methodology for understanding internal and external value networks. Technically, a value network can be represented as a direct graph where the nodes represent network participants and the edges show the flow of material objects and non-material (intangible) values such as information or brand recognition values in the network. Generally, VNA is used to quantitatively analyze the flow of tangible and intangible assets in business networks.

While VNA is used to discover hidden relationships between tangible and intangible flows in the enterprises, Community Knowledge Systems (CKS) and information mining system are used to create Value Network topologies and related value exchange processes.

It would be highly desirable to provide a technique for connecting the knowledge about missions discovered using VNA and corresponding data relations modeling systems (Galapagos and provenance-aware systems) to create a method and a system that would allow for optimization of provisioning for IT resources, and for prioritizing of control for data and application security and integrity.

SUMMARY OF THE INVENTION

The present invention provides a system and a method for connecting IT infrastructure and data relations discovery by systems such as Galapagos and other provenance-aware systems, with the higher-level mission models, such as VNA a by using applications, application users, and users' missions as connecting points. Further, such connections are used to map IT level resources with related business-level value exchanges.

When such connection is achieved the mission models generated will include edges of value network that will represent values exchanged between mission participants. These edges will in turn represent tangible physical assets, such as real estate, equipment, hardware assets, financial investments, etc. and also intangible assets, such as data transfers, training goals and objectives, and importance of security of a document or a database.

In one embodiment, this connection is achieved by using applications as connecting points. In such approach, IT resources such as, for example URLs for accessing a specific application or data models, are analyzed for authentication history. Users allowed to access specific IT resource are identified against users or groups assigned for a specific mission performance. This will in turn create necessary relation between mission participants and IT resources required for achieving such mission.

Connecting applications, application users, and users' missions will allow for creating of unique system able to connect abstract mission objectives to the IT infrastructure required for achieving such objectives and every data object within such infrastructure.

Thus, in one aspect of the invention, there is provided a method and a system for relating of a value network analysis of a mission to a knowledge base of dependencies of data objects, applications and information technology resources required for achieving of such mission, such method used for optimization of provisioning for information technology resources and for prioritizing of control of data and application security and integrity of such mission, the method comprising: identifying nodes of a value network of such mission as participants of the mission, identifying edges of a value network of such mission as exchanges of values between the participants of the mission, assigning biased values to the nodes and the edges, and, creating at least two associations, each association relating a value network node to at least one of data objects, applications or information technology resources used by said value network node, and to at least one information exchange path used to exchange information between data objects, applications or information technology resources.

DETAILED DESCRIPTION OF THE INVENTION

The present invention is directed to a system and a method for connecting IT infrastructure with data relations discovery systems such as previously discussed Galapagos and provenance-aware systems, with the higher—level mission models, such as VNA, by using applications, application users, and users' missions as connecting points.

Numerous end-to-end information discovery systems determine dependencies between applications, middleware components, data, and corresponding IT infrastructure. Value Network Analysis methods and alike allow classifying operations and missions with the high degree of confidence, therefore creating comprehensive logical connection between missions and tangible and intangible assets involved in accomplishing such missions.

There are two key observations that are common to VNA for optimization of provisioning for IT resources, and for prioritizing of control of data and application security and integrity systems which can be used to connect the high-level knowledge about missions with the knowledge of corresponding IT infrastructure: mission participants have known roles and they belong to one or several particular missions; these mission participants are also the users of applications with well defined credentials.

Figure 4:
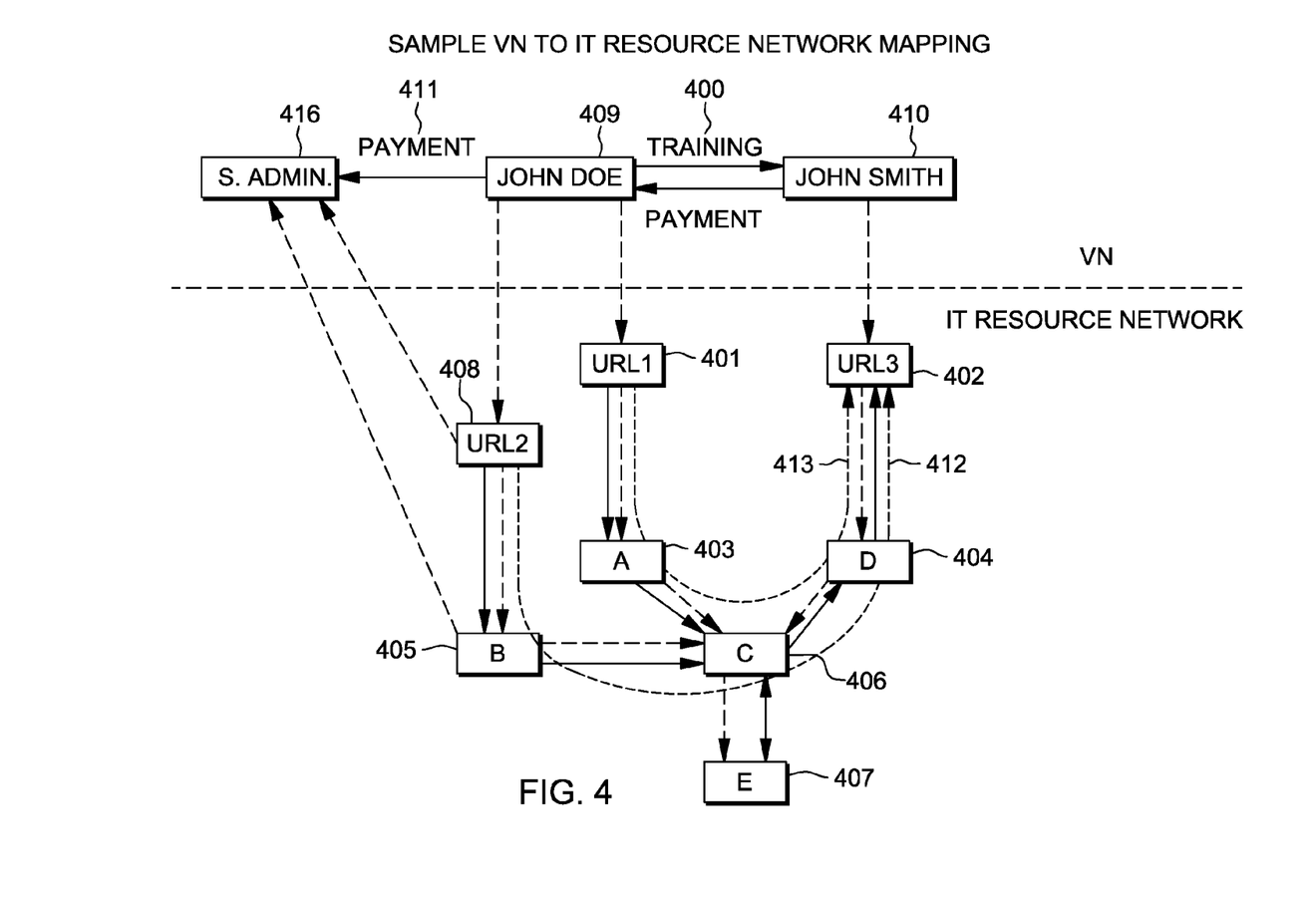
FIG. 4 is an example of mapping of two directed paths to "training" Value Network edge

In one embodiment, applications, or their access points such as URLs, application users, and users' missions are used as connecting points between high level mission information and the related IT resources. More specifically, an application's ability to identify its users and, further, relating such users to mission participants are used for such connection. For example, if a person, or process, or a robot uses an application, the corresponding data, network traffic, and IT infrastructure belong to the same mission and have the same importance for the mission as the person's role in the project or within the organization. In one embodiment of the invention, this is implemented by using a database that maps people and their authentication credentials, such as access logs, Microsoft Active Directory® or Novell's NDIS Tree® to identify such users and their roles within organization, and connect them to applications used by them. For example, FIG. 4 shows connectivity between VN nodes 409, 410 and the top-level IT resource network nodes, URLs in this example 401, 402 and 408.

This knowledge connectivity approach is bidirectional. For example, to prioritize storage reliability, applications may be mapped to their users, mission model systems can be used to find related applications, or users may be mapped to their mission roles. Therefore, high-level information for every data object or IT infrastructure component can be extracted.

Figure 2:
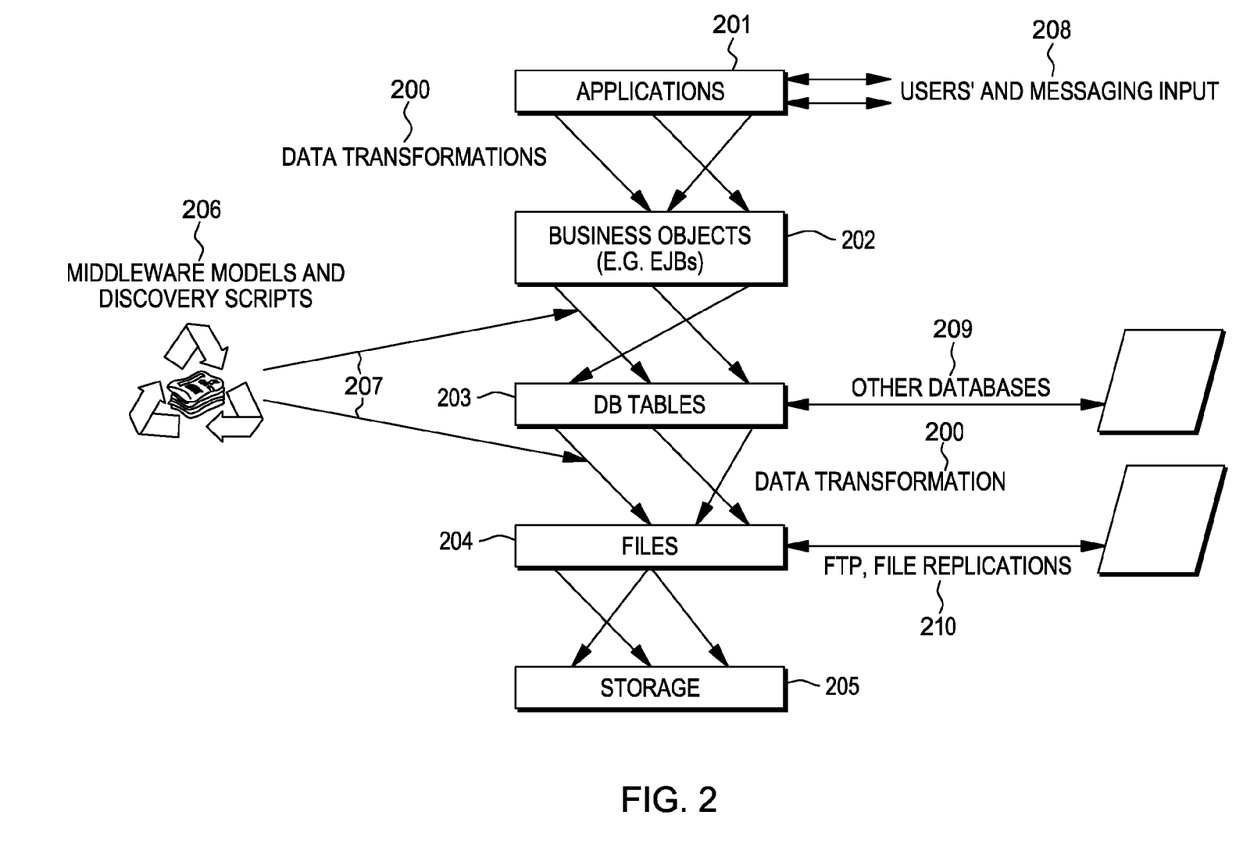
FIG. 2 is a block diagram representing Hierarchical Data Dependencies.

As shown in FIG. 2, modem information systems are multi-tiered and therefore hierarchical data dependencies are very complex. It is impossible to understand which application 201 uses a particular data file 204 as paths to such files could be non-descriptive and also data files 204 are available for access by different applications 201 and database platforms 203 in today's multiplatform environment. However this information is vital for the information lifecycle management.

Hierarchical data dependency discovery systems such as Galapagos allow for use of composable middleware models 206 and discovery scripts 207 to track data transformations 200. For example, such systems identify how DB2 tables 203 relate to data files 204, or how SQL tables 209 relate to applications 201, business objects of applications 202, and to communication queues 210 when queries are requested by users 208. At last, such systems use distributed crawling algorithms (not shown) which in turn collect information from composable middleware models and discovery scripts 206 on data dependencies 200 across middleware layers. These data dependencies 200 have properties such as "data flow direction" (i.e. read/write) and "depends on direction". Such IT resource dependency is well illustrated in FIG. 4. It depicts how nodes 408 and 405 depend on VN node 416, which represents the administrator of these IT resources. This dependency is usually discovered through queries of enterprise directories, access logs, and per-IT-resource authentication information such as 'root' user real names from /etc/passwd files.

Figure 1:
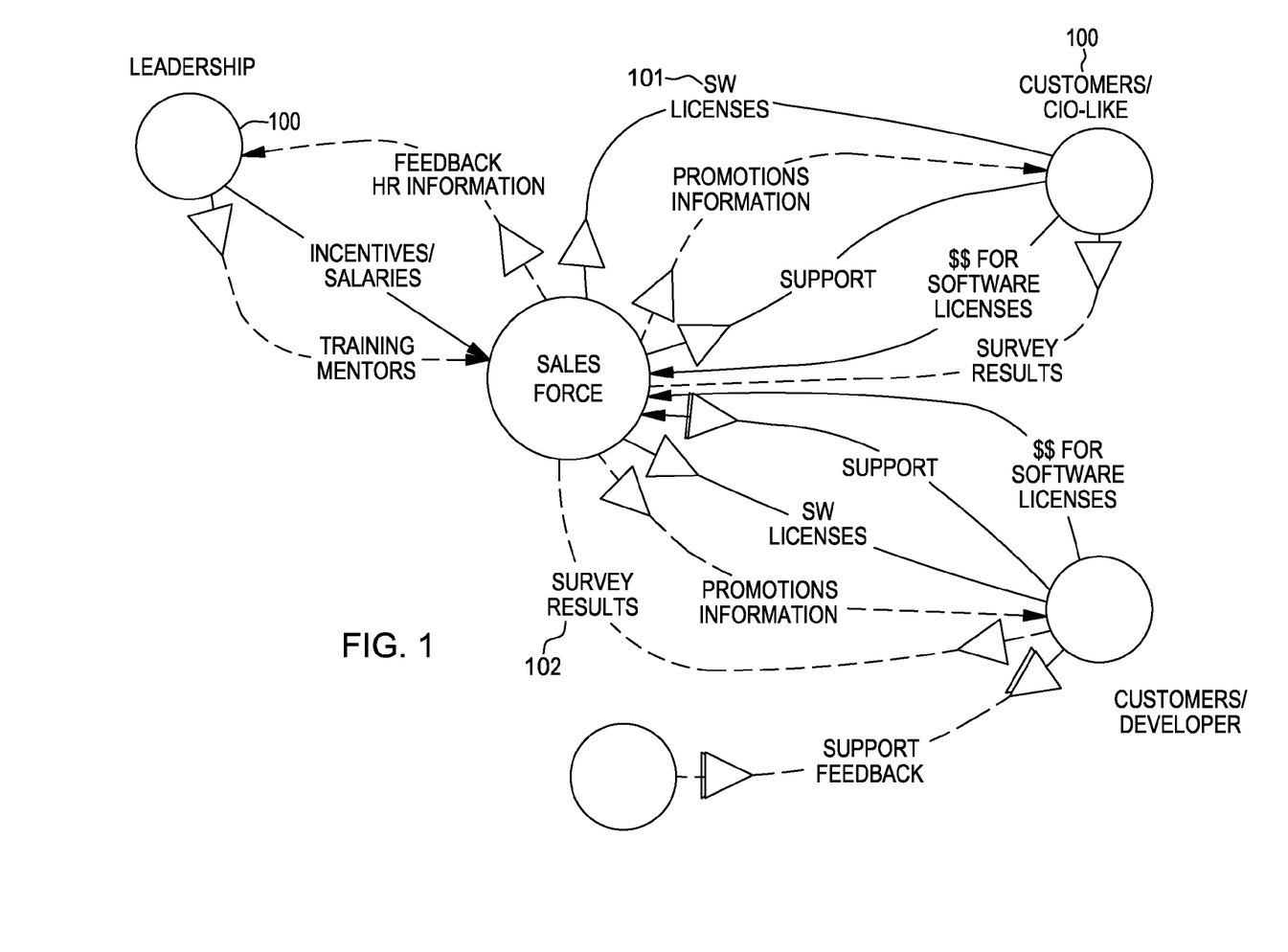
FIG. 1 is a schematic diagram representing Value Network Analysis.

FIG. 1 illustrates an example of a value network, which depicts entities (representing participants such as clients, customers, etc. shown as nodes 100) and transfers of data 101 and 102 between such entities. This representation is inclusive of such entities within the control of the enterprise and those outside such control. Each node shown has an operational model based on the business artifacts, i.e., leadership, customers, sales force, etc. processed. Such VN's topology is usually constructed manually or using community knowledge.

Further, FIG. 1 is illustrative of how VNA allows for prioritizing tangible transfers, shown as solid lines 101 in FIG. 1, such as data about salaries provided for sales force or customer support data, and intangible transfers, shown as broken lines 102 in FIG. 1, such as training, promotional information or survey results data. Such qualitative and quantitative analysis is performed by assigning values (weights) by administrators, project managers or users selected to be in charge of particular missions to operations and data exchanges. The values (weights) of VN edges are usually either assigned using information mining technologies (see e.g., Wlodek Zadrozny, "Leveraging the Power of Intangible Assets" MIT Sloan Management review, Fall 2006, Vol. 48, No. 1, pp. 85-89) or using community knowledge (not shown). For example, internal sales force knowledge regarding required turn around support time for a particular customer, to identify participating units, that are not so easily assumed, and to assign weights to data exchanges such as regarding support, training, ammunition information, incentives or salaries, etc.

Figure 3:
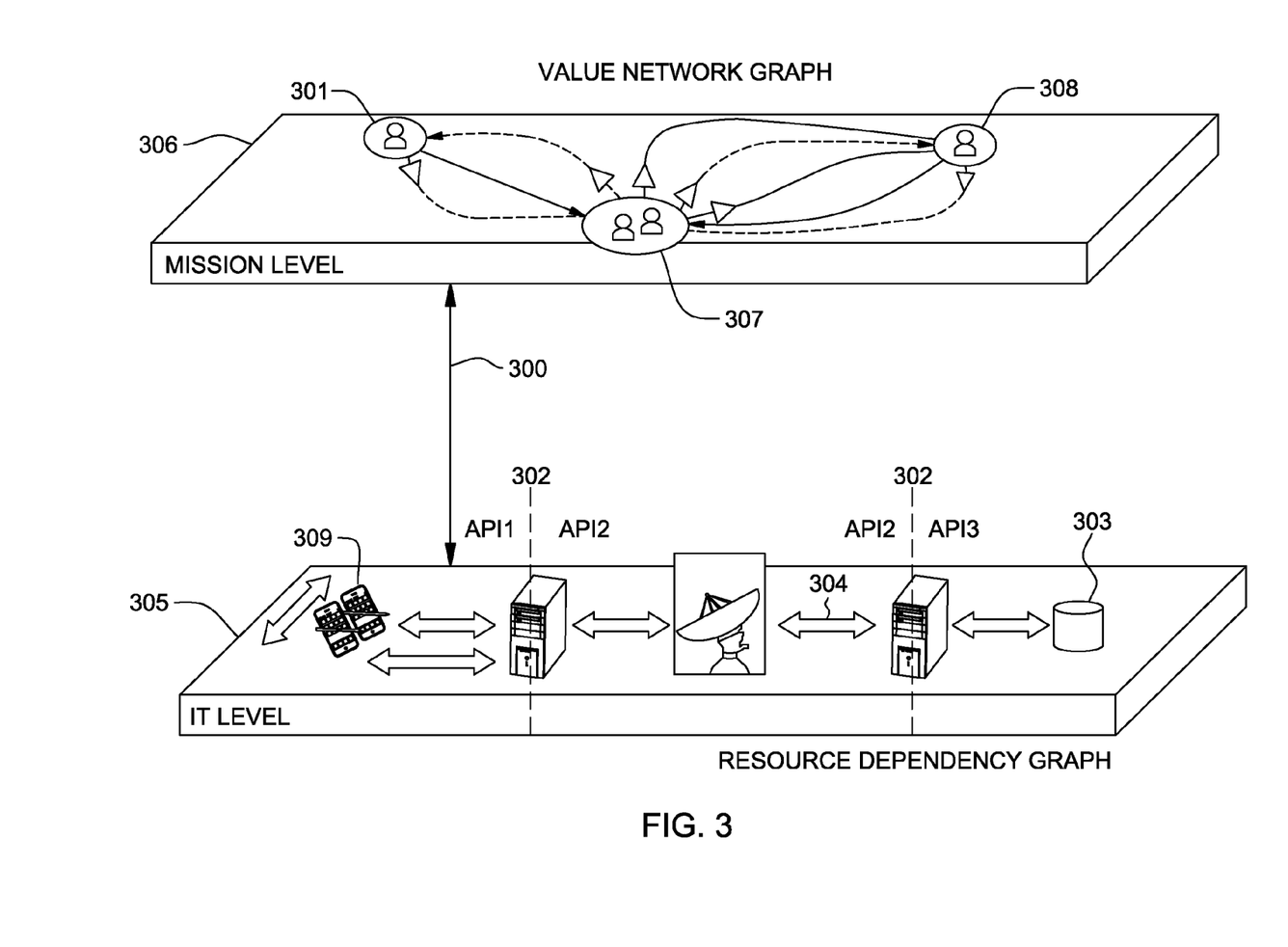
FIG. 3 is a schematic diagram representing one embodiment of the invention wherein the nodes of a graph obtained from Value Network Analysis system (VNA) are mapped with one or more nodes of Information Technology (IT) Resource Dependency graph according to the invention.

FIG. 3 illustrates one embodiment of a method for connecting an example IT infrastructure 305, represented as Resource Dependency Graph, with Value Network Graph 306, where nodes 301, 307, 308 of the VNA graph represent entities participating in a particular mission and are arranged in order of importance of activity within such mission. More specifically, level of importance decreases from left, 301 being the most important, i.e., mission leadership node, to the right, 308 being the least important, where these levels of importance (weights) are assigned by a mission leader. Resource Dependency Graph 305 illustrates application—data relationship consisting of IT components 302 and stored 303 or transmitted 304 data that is necessary to complete such mission 306. In one embodiment, the actual connection 300 is performed via creating a new database (not shown) populated by pairs of relationships between entries 301, 307, 308 from the Value Network Graph 306 and entries 302, 303, 304, 309 from Resource Dependency Graph 305. This embodiment illustrates how such method is useful for quickly identifying IT resources necessary for completion of a particular mission, prioritizing their importance within such mission and optimizing of provisioning for such IT resources.

FIG. 4 depicts an embodiment where Value Network nodes 409 and 410, and value exchange edge 400 are related to the information flow paths shown by the dotted arrows 412 and 413 in the IT resource graph. This relationship is established by finding all information flows, shown by solid arrows that connect top-level resource nodes (i.e. URLs) 401, 402 and 408 in the same direction as the VN edge 400, that are mapped to the VN nodes 409 and 410. In the shown embodiment, the relationship between the value exchange edge 400 and information flows 412 and 413 is useful to establish desired connection between Value Network and application—data relationship.

As further shown in FIG. 4, the information flow paths depend on other resources and, therefore the value exchange path 400 also depends on such resources. Information flow paths and IT resources that such information flow paths depend on are discovered by following all dependencies, shown by dashed arrows, for every involved IT resource. In particular, both information flow paths 412 and 413 depend on IT resource 407. In addition, path 412 depends on resource 416, which belongs to both VN and IT resource networks. This is the result of systems administrator's participation in business operation as well as being a part of the IT infrastructure. This is a good illustration of how the connection of VN nodes is established between each other via IT infrastructure.

To further illustrate this concept, if an edge depicting data exchange between value nodes 416 and 409 is missing and it is not clear from VN that "payment" 411 is necessary, then the uncovered dependency between 400, 416, and in turn 411 may be used as a hint to the VN creators to refine their model and to add a new edge depicting "support" value provided by 416 to 409.

Additionally, the discovered relationships are further refined. More specifically, only one of the two discovered paths may really correspond to a value exchange. This is well illustrated by the value exchange 400, which can only correspond to "training" exchange. Such refining, in one embodiment, is done by asking VN participants to select the URLs out of the list that they believe indeed corresponds to such training mission. This is also achieved by preparing related questioners, and having people, initially forming such VN nodes, provide extra information about the data exchanges shown as VN edges 400 and 411.

Similarly, in the embodiment shown in FIG. 3, there may further be a need to resolve conflicts. For example, two information flow paths may get mapped to the same edge of the VNA graph. Such conflicts are resolved by getting extra information i.e. redefining or splitting VNA graph nodes. For instance, Mission Leadership node 301 may be further split into three nodes CEO, CFO and CTO to eliminate multiple network paths.

In another embodiment (not shown), the method is implemented by creating a database where VNA nodes and corresponding IT components are related to each other by corresponding applications. Such relationship is identified by the user information required for accessing particular application. Such identification is the result of authentication requirements, or the result of using crawling algorithms to observe application log files, or monitoring applications at run time. Such relationship is further established by identifying users' information and their status in a particular mission, project or within a company through user databases that map people to their authentication credentials, such as Microsoft Active Directory® or Novell's NDIS Tree®.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

What is claimed as new:

1. A computer-implemented method of relating of a value network analysis of a mission to a knowledge base of dependencies of data objects, applications, support personnel, and information technology resources required for achieving of said mission, said method used for optimization of provisioning for information technology resources, and for prioritizing of control for data and application security and integrity of said mission, said method comprising:
   identifying nodes of a value network of said mission as participants of said mission,
   identifying edges of a value network of said mission as exchanges of values between said participants of said mission,
   assigning biased values to said nodes and said edges, and,
   creating at least two associations, each association relating a value network node to at least one of data objects, applications or information technology resources used by said value network node, and each association relating a value network node to at least one information exchange path used to exchange information between said data objects, applications or information technology resources.

2. The computer-implemented method, according to claim 1, further comprising: connecting identified value network edges and said information exchange paths as a pair of associations.

3. The computer-implemented method, according to claim 2, wherein said value network edges connect value network nodes contained within said pair of associations.

4. The computer-implemented method, according to claim 1, wherein said information exchange path connects a set of Information Technology resources and a set of dependencies on said Information Technology resources and support personnel within said pair of associations.

5. The computer-implemented method, according to claim 1, further comprising: using a community knowledge to farther identify mission participants to assign biased values to said nodes of said value network.

6. The computer-implemented method as in claim 1, further comprising: performing one or more of text mining or data mining to assign biased values to said nodes of said value network.

7. The computer-implemented method as in claim 1, further comprising: performing one or more of text mining or data mining to assign biased values to said data objects, applications and information technology resources, and said information exchange paths.

8. The computer-implemented method as in claim 7, further comprising: coupling of relations between value network edges and information exchange paths with their dependent resources for a pair of associations based on assigned biased values.

9. The computer-implemented method as in claim 8, further comprising: dividing said nodes into more nodes based on information obtained from data mining and text mining regarding said nodes, edges and paths, if more than one information exchange path relates to said nodes.

10. The computer-implemented method as in claim 8, further comprising: dividing said nodes into more nodes based on information obtained from community knowledge regarding said nodes, edges and paths, if more than one information exchange path relates to said nodes.

11. A system for relating a value network analysis of a mission to a knowledge base of dependencies of data objects, applications and information technology resources required for achieving of said mission, said system comprising:
    means for identifying nodes of a value network of said mission as participants of said mission,
    means for identifying edges of a value network of said mission as exchanges of values between said participants of said mission,
    means for assigning biased values to said nodes and said edges,
    means for generating at least two associations, each association relating a value network node to at least one of data object, application or information technology resource used by said value network node, and to at least one information exchange path used to exchange information between said data object, application or information technology resource, and,
    database means for storing said associations, wherein, said relating is done by finding common resources through analyzing data obtained form a process of authenticating access to said data objects, applications and information technology resources.

12. A system as in claim 11, wherein said relating is done by finding common resources through analyzing data obtained form a process of authenticating access to said data objects, applications and information technology resources.

13. A system as in claim 11, further comprising:
    a database solution capable of storing information about at least a pair of connecting value network edges and relating said information to a pair of information technology resource network edges.

14. A system as in claim 11, further capable of relating said value network nodes to at least one of data objects, applications or information technology resources.

15. A system as in claim 11, further capable of relating said value network nodes to at least one of information exchange paths used to exchange information between said data objects, applications or information technology resources.

16. A system as in claim 11, further capable of relating value network edges and said information exchange paths for a pair of associations.

17. A system as in claim 11, wherein the edges of the value network are further related to the information technology resource paths that connect the value network nodes and thus are related to all information technology resources comprising the paths.

18. A system as in claim 17, wherein the mapping between paths and value network edges can take into account the information flow direction between information technology resources and value network edge direction.

19. A system as in claim 18, wherein the information technology paths and value network edges relations can be further refined based on information obtained from auxiliary sources.

20. A system as in claim 18, wherein the information technology paths and value network edges relations can be further manually refined by a designated user.

* * * * *